Dec. 30, 1930.  E. L. SCHUMACHER  1,786,580
OPHTHALMIC MOUNTING
Filed Jan. 9, 1928

Inventor
Elmer L. Schumacher.
By Harry H. Styll.
Attorney

Patented Dec. 30, 1930

1,786,580

UNITED STATES PATENT OFFICE

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed January 9, 1928. Serial No. 245,600.

This invention relates to improvements in parts for ophthalmic mountings and has particular reference to supporting a metallic member on a composition temple or similar part and the process of making same.

The principal object of the invention is to provide reinforcing means for forming a seat for a metallic member adjacent the front end of a temple for an ophthalmic mounting or a similar part.

Another object of the invention is to provide an additional amount of composition material adjacent the endpiece or hinge end of a composition temple or similar part formed of tubular stock reinforced with metal so that a suitable seat may be formed in the composition for seating a metallic part.

Another object is to form a part of an ophthalmic mounting of plain cellulose tubing reinforced with metal and treating the tubing to give it a mottled effect when finished.

Another object is to provide simple, efficient and economical means whereby a composition member reinforced with metal may be formed of tubular composition of even thickness throughout its length and have sufficient material adjacent its front end for supporting an endpiece or hinge member or other part.

Other objects and advantages of the invention will become apparent from the following specification taken in connection with the accompanying drawings, and it will be apparent that many changes in the steps of the process and in the arrangement and construction of the parts may be made without departing from the spirit of the invention as expressed in the accompanying claims. I, therefore, do not wish to be limited to the exact details and arrangements shown, the preferred forms and steps of the process only having been shown by way of illustration.

Referring to the accompanying drawings.

Prior to the present invention it was necessary to form a reinforced composition temple having a mottled effect from sheet stock as it was impossible to obtain mottled composition in tubular form. The process involved for forming a finished temple was to secure a metallic core within a groove formed between two pieces of mottled composition by securing the two pieces together with a suitable adhesive and then shaping the composition to the desired form by milling, filing and other expensive operations.

The present invention obviates these expensive operations by forming a reinforced temple from a tubular composition which requires no milling or shaping throughout its length and which is treated prior to the polishing and finishing to give it a mottled appearance. It is also reinforced adjacent the hinge connection to provide a rigid and neat appearing hinge support.

Figure 1:
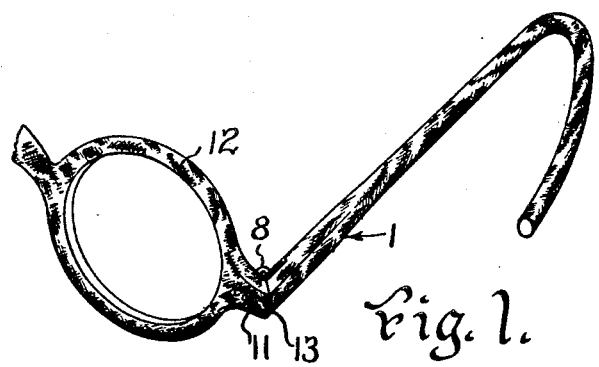
Fig. 1 is a partial perspective view of a pair of spectacles to which the invention has been applied.
Figure 2:
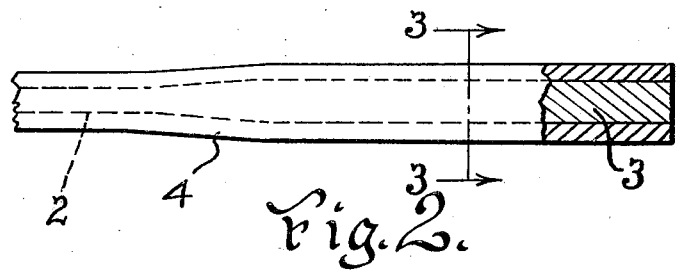
Fig. 2 is a fragmentary elevation of a temple partially shown in section illustrating one step in the process of manufacture.
Figure 3:
Fig. 3 is a section on line 3—3 of Fig. 2.
Figure 4:
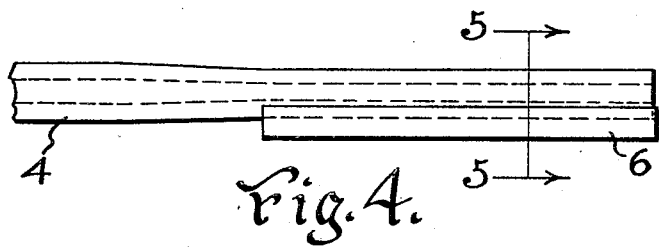
Fig. 4 is a plan view of Fig. 1 showing the reinforcing member in position.
Figure 5:
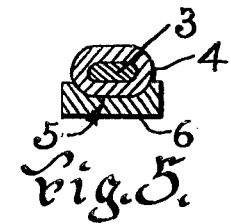
Fig. 5 is a section on line 5—5 of Fig. 4.
Figure 8:
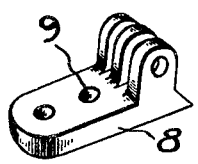
Fig. 8 is a perspective view of the hinge member.
Figure 6:
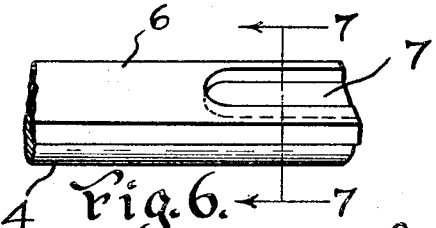
Fig. 6 is a fragmentary perspective view of the temple showing the seat for the hinge member.
Figure 7:
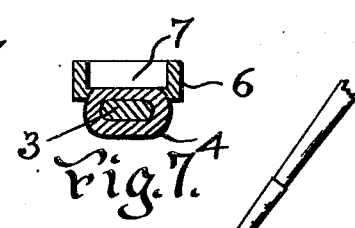
Fig. 7 is a section on line 7—7 of Fig. 6.
Figure 9:
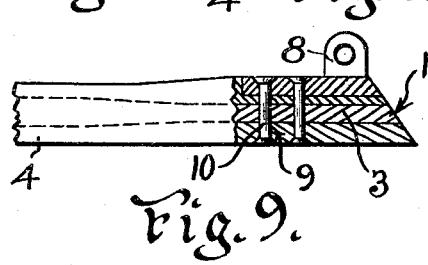
Fig. 9 is a fragmentary elevation partially in section showing the hinge member positioned on the temple.
Figure 10:
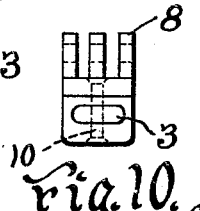
Fig. 10 is an end view of Fig. 9 illustrating the finished end of the temple.
Figure 11:
Fig. 11 is a fragmentary elevation illustrating how the mottled effect is obtained.

Referring more particularly to the drawings, the finished temple 1 is formed by inserting the metallic core 2 having a flattened portion 3 within a composition tube 4. The flattened portion 3 when pressed within the tube 4 causes the tube to flatten as indicated at 5 in Fig. 3. A reinforcing block 6 of a composition similar to the tube 4 is secured to the flattened end 5 by a suitable adhesive such as liquid celluloid, as indicated in Figs. 4 and 5, and is then recessed as at 7 in Figs. 6 and 7 to form a seat for the endpiece or hinge member 8. The hinge member 8 is then positioned in the recess 7 and the holes 9 are drilled through the hinge member and metallic core for the rivets or the like 10 which secure the hinge member 8 to the end of the temple. The surplus material is then removed from the temple about the hinge joint and the temple is finished by shaping the reinforcing member 6 to blend with the tube 4, after which it is tinted as shown in Fig. 11 and polished to obtain the mottled appearance. The temple is then connected to the endpiece 11 of the frame 12 and the face 13 bevelled to fit the bevel on the endpiece 11, it being understood that the ear loop is formed prior to its being fitted to the frame.

The tinting operation is accomplished by brushing a colored cellulose liquid or the like over portions of the surface of the plain composition, as illustrated in Fig. 11. The cellulose liquid is absorbed by and blended with the composition so that when the surface is highly polished it will have a mottled appearance.

From the foregoing description it will be seen that I have provided simple, inexpensive and efficient means for overcoming the difficulties of prior art temples of this character and for obtaining a neat appearing and durable construction.

Having described my invention, I claim:

1. The process of making a part for an ophthalmic mounting comprising forming a metallic core with a flattened portion adjacent one end, pressing a non-metallic tube over the metallic core and flattened portion to cause the tube to flatten over the flattened portion of the metallic core, securing a non-metallic reinforcing member to the flattened portion of the tube, shaping out a recess for a metallic member therein, riveting a metallic member in the recess and through the core and shaping up the remaining portion of the reinforcing member to blend it with the non-metallic tube and metallic member.

2. The process of making a part for an ophthalmic mounting comprising forming a metallic core with a flattened portion adjacent one end, pressing a non-metallic tube over the metallic core and flattened portion to cause the tube to flatten over the flattened portion of the metallic core, securing a non-metallic reinforcing member to the flattened portion of the tube, shaping out a recess for a metallic member therein, riveting a metallic member in the recess and through the core, shaping up the remaining portion of the reinforcing member to blend it with the non-metallic tube and metallic member, and tinting the blended reinforcing member and tube to give them a mottled appearance.

3. A part for an ophthalmic mounting comprising a tubular temple side with a core in said tube, said core and temple side being widened adjacent the hinge joint end of the temple side, a building-up member on the temple side over the widened portion, and a hinge ear secured to said building-up member, the said securing means being attached to the core.

4. A part for an ophthalmic mounting comprising a tubular temple side with a solid core in said tube, said core and temple side being widened adjacent the hinge joint end of the temple side, a building-up member on the temple side over the widened portion, and a hinge ear secured to said building-up member, the securing means passing through the solid core.

5. The process of making a part for an ophthalmic mounting comprising forming a metallic core with a flattened portion adjacent one end, pressing a non-metallic tube over the metallic core to cause the tube to flatten over the flattened portion of the core, securing a non-metallic reinforcing member to the flattened portion of the tube, and securing a hinge member to the reinforcing member and shaping up the reinforcing member to blend with the tube.

6. A part for an ophthalmic mounting comprising a tubular temple side with a core in said tube, said core and temple side being widened adjacent the hinge joint end of the temple side, a building-up member on the temple side over the widened portion, and a hinge ear secured to said building-up member, the securing means passing through the core.

ELMER L. SCHUMACHER.